F. H. CHAPMAN.
BALL BEARING SPINDLE.
APPLICATION FILED DEC. 18, 1917.
1,338,904.
Patented May 4, 1920.
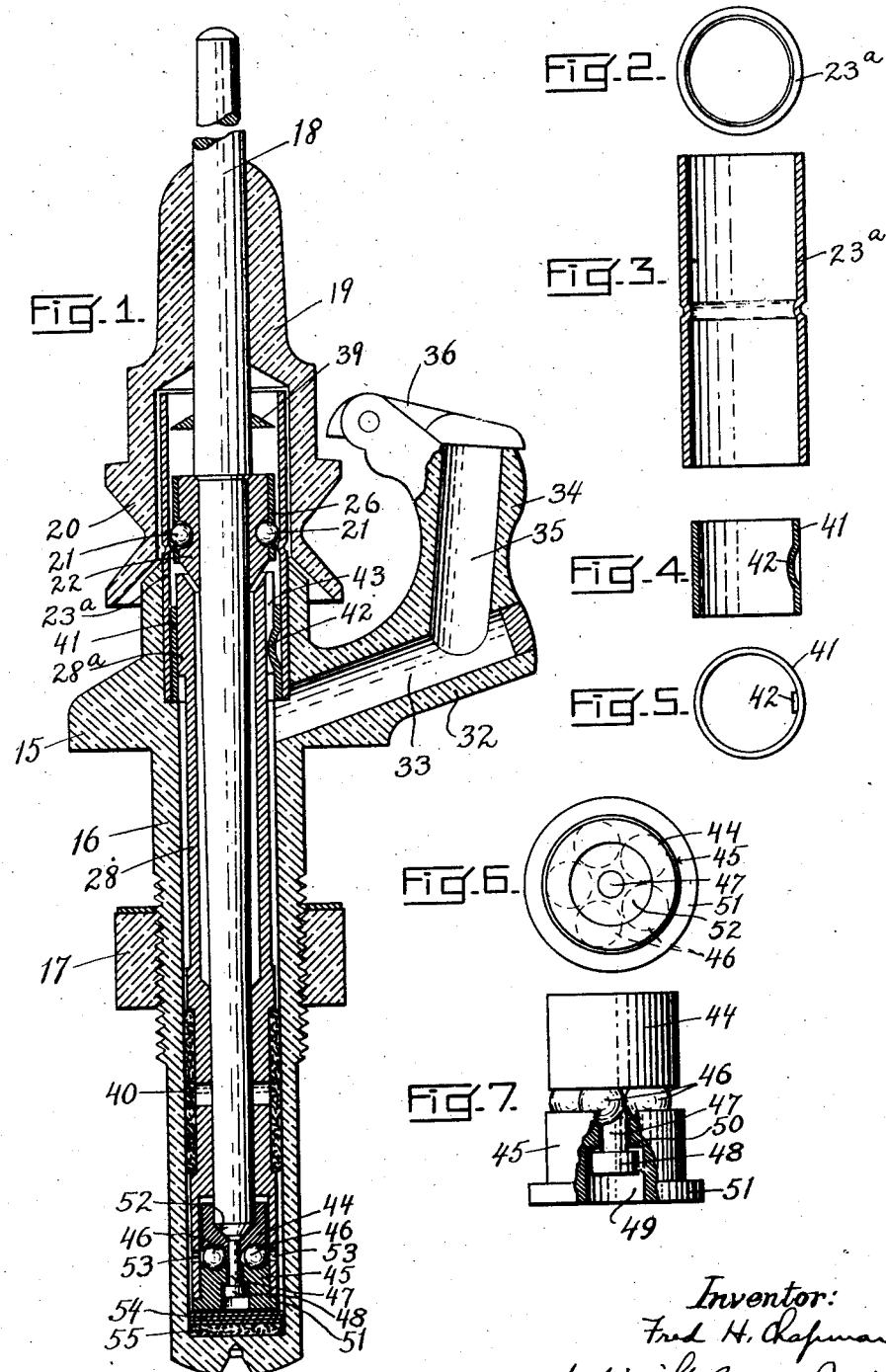

UNITED STATES PATENT OFFICE.

FRED HILDRETH CHAPMAN, OF WINCHESTER, MASSACHUSETTS.

BALL-BEARING SPINDLE.

1,338,904.

Specification of Letters Patent.  Patented May 4, 1920.

Application filed December 18, 1917. Serial No. 207,749.

*To all whom it may concern:*

Be it known that I, FRED HILDRETH CHAPMAN, a citizen of the United States, residing at Winchester, in the county of Middlesex and State of Massachusetts, have invented new and useful Improvements in Ball-Bearing Spindles, of which the following is a specification.

This invention relates to spindles of the sort used in machines for spinning or twisting yarn, thread, etc., and is particularly adapted, although not necessarily limited, to the species of such spindle disclosed in my pending application for Letters Patent of the United States filed November 27, 1916, Serial Number 133,556. My present objects are principally to provide a spindle having a ball bearing step to carry the perpendicular load, together with a lateral ball bearing to determine the position of the spindle and sustain the pull of the driving band, together with means for adjusting and renewing the lateral bearing to compensate for the effects of wear; and further to furnish as an article of commerce a step bearing of the ball bearing type adapted for use with spindles of various sorts.

As the result of many years practice in the manufacture of ball bearing spindles, and of experimentation and careful study of the capacity of spindles of this type to resist wear, I have found that while it is possible to harden the blade of a spindle at its lower end or step sufficiently to withstand the wear of an ordinary step bearing, without at the same time making the balance of the blade so brittle as to be in danger of breaking under the stresses met with in practical use, it is not possible to give the blade that quality of hardness which is required for the ball races and balls of a ball bearing, wherefore the blade can not be caused satisfactorily to run in contact with balls at its foot. This is due to the fact that the blade must have great stiffness to prevent bending under the stresses met with in service, which include those resulting from the rotation of the blade at extremely high speed while carrying a more or less unbalanced load, wherefore the blade must be made of a relatively high-carbon steel to give it the necessary hardness and stiffness. But such steel cannot be made resistant to the particular character of wear caused by running in contact with balls, because if hardened it is so brittle that its surface cracks and chips under the concentrated pressure applied through the points of contact with the balls, while if not hardened, it does not sufficiently resist wear.

Having regard to these observed facts, it has been my object to provide a step bearing equipped with balls, which will give to the spindle all of the benefits of comparative freedom from friction while supporting the weight of the blade, and by which the blade itself will be protected from coming into direct contact with the balls. This object is accomplished in the ball bearing step having the characteristics hereinafter particularly pointed out, and illustrated in the accompanying drawings. This is one of the features of my present invention.

Another feature of the invention concerns the adjustment and renewal of a lateral bearing of the same general type as that shown in my prior application Serial No. 133,556, hereinbefore referred to, and includes a reversible or invertible bolster or sleeve forming the outer ball race or contact surface for the lateral ball bearing, and means for shifting the position of the lateral bearing endwise with respect to this sleeve or bolster.

The invention consists in the new features of combination between a spindle blade and the adjustable and renewable lateral bearing; in the combination of such blade with the ball bearing step, both with and without the improved lateral bearing, and with and without capacity for lateral cushioned movement of the step; and in the improved ball bearing step and all structures equivalent to the specific embodiment of that construction hereinafter described, as set forth in the following specification in connection with the drawings, and as particularly pointed out in the claims.

In the drawings,

Figure 1 is a vertical or longitudinal central sectional view of a spindle embodying the improvements which I here claim.

Figs. 2 and 3 are respectively a plan view and a longitudinal section of the lateral bearing sleeve or bolster hereinbefore referred to.

Figs. 4 and 5 are respectively a longitudinal section and a plan view of the part which I call a " keyed ring ".

Figs. 6 and 7 are respectively a plan view and an elevation, partly broken away, shown on an enlarged scale of my novel ball bearing step.

The same reference characters indicate the same parts in all the figures.

The illustration of the invention as hereinbefore briefly described shows the same as applied to a spindle of the specific type disclosed in my prior application Serial Number 133,556, for which reason I shall confine my description of the parts which are common to the drawings in this and the prior application, to a brief catalogue of the same, using the same reference characters. 15 is the spindle base, 16 the tubular extension or socket thereof closed at the lower end, 17 a clamp nut threaded on such extension to clamp the same to the rail of a spinning frame; 18 is the blade or spindle proper, 19 the whirl fixed on the blade, and 20 the pulley with which the whirl is provided to receive the driving band whereby the spindle is rotated. The ball bearing which centers the blade and supports the band pull, which for this reason I have called the lateral ball bearing, in distinction from the step bearing ball, occupies the same relation to the whirl and its pulley as defined in said prior application, and comprises balls 21, inner ball race 22, the outer ball race 23ª which in this specification I have called also a sleeve and a bolster, and a retaining ring 26 fitted on the sleeve 22 which provides the inner race, and sufficiently overhanging the balls to retain them in the groove in said sleeve.

28 is the sleeve which contains the step bearing for the blade, and it is so mounted as to permit a lateral cushioned movement of the spindle step, by being of smaller diameter than the exterior of the extension 16, and being preferably also provided with a wrapping 40 of elastically yielding compressible material, preferably felt or textile fabric, or equivalent fibrous material. 32 is the arm at one side of the base having a passage 33, and 34 a post having a passage 35 rising from the arm and carrying the doffer guard 36 which is made to provide also a cover for the inlet tube passage. These passages admit oil to the interior of the base and maintain the level of the oil therein above the lateral ball bearing. 39 is the oil stop attached to the blade having the construction, location, and functions of the corresponding stop described in my prior application.

The novel features of the present invention include the following: The bolster or outer sleeve for the lateral ball bearing is reversible, and for that purpose it is made alike at both ends and is adapted to be removed from the base, reversed and its other end inserted. Engagement between this sleeve or bolster and the sleeve 28, to center the latter sleeve and prevent its rotation, is made by what I call a "keyed ring" 41 which fits frictionally within the sleeve 23ª and has an inwardly offset part 42, forming a key which enters a groove or a keyway 43 in the sleeve 28. The latter has an enlarged portion 28ª which fits the interior of the ring 41 with sufficient looseness to permit its lower end, with the step bearing, to move laterally as far as permitted by the limits of the base extension or sockets 16. This keyed ring 41 comes out with the sleeve or bolster 23ª when the latter is withdrawn from the base, and may be driven out from one end, and inserted in the other end, of such bolster, without injury, when the latter is to be reversed.

The ball bearing step comprises two thrust blocks 44 and 45 and a set of balls 46 between them, these blocks having grooves or races to receive the balls as shown in Fig. 1. The blocks are permanently connected together by a pivot 47 fitted tightly at one end in the block 44, and loosely fitted in a passage in the block 45, such pivot having a head 48 contained in an enlarged socket 49 in the block 45, and underlapping a shoulder 50 at the bottom of such socket. The looseness or the lost motion which is provided between both the shank and head of this pivot and the block 45, permits the latter to adjust itself to the balls and avoids danger of binding the latter. At the same time the lost motion in the axial direction is less than the depth of either ball race, so that the blocks can not be separated accidentally far enough to let the balls fall out. Thus the bearing is a self-contained unit adapted to be marketed as such and to be applied by the purchaser to the spindle.

In applying this step bearing, it is inserted into the lower end of the step bearing sleeve 28, which is bored out to receive it, as shown in Fig. 1. The outer surface of the block 45 is proportioned to fit freely, but not loosely, in the bored out recess in the sleeve, or it may be secured firmly therein, while penetration of the bearing into such recess is limited by a lip 51 on the end of this block. The block 44 is of smaller diameter and does not extend to the end of the recess, whereby it rotates freely without touching any part of the sleeve 28. It has a socket 52 in which the bottom end or foot of the blade may enter, and on the bottom of which the latter may rest. Oil to lubricate the step bearing is admitted through the holes 53 in the sides of the sleeve 28 opposite to the balls.

The bottom of the step bearing rests upon the spacing washers 54, the same being preferably of metal, which in turn rest upon a cushion 55 formed of some compressible material such as felt. These washers and cushion support the step bearing, and the latter supports the blade and the load mounted on the blade, relieving the lateral bearing of all load except that imposed laterally by the driving band and by the centrifugal force of an unbalanced loading of the spindle. At the same time the step bearing is free to move laterally within the limits imposed by the walls of the socket 16, to permit the lateral cushioned movement required of a spindle operating at a high rotational speed, as fully explained in my aforesaid prior application. In addition to all of the advantages and useful features set forth in my prior application before referred to, this improved spindle includes the following.

(1) Removal of the blade does not displace or disarrange the balls of the step bearing in any manner. All spindles are subject to handling, setting, cleaning, dismounting, etc., by the work people employed in the mill, who are not necessarily efficient mechanics, and whose knowledge of mechanism is in fact frequently very limited indeed. In dismounting and mounting the spindle the bearings can not become disarranged, and in mounting, the several elements of the spindle can be assembled in only one way, the proper way, to make the spindle run at all. In other words, it is not possible to mount the spindle incorrectly, but in such a manner as to give a deceptive appearance of being in proper running order.

(2) The invention combines the advantages of a ball step bearing with the desired freedom for lateral cushioned movement of the spindle step.

(3) Adjustment of the lateral bearing to compensate for wear is accomplished by adding one or more washers like the washers 54 from time to time so as to bring the bearing point of the balls upon the outer sleeve or bolster to an unworn zone of the latter. When the limit of adjustment in this manner has been reached, the sleeve or bolster 23ª may be inverted and replaced in the manner previously described, the extra washers being removed as required. The blade and inner sleeve 28 are readily removable for the purpose of adding or removing washers, and when the sleeve is withdrawn the step bearing comes with it, the latter being fitted tightly enough into the sleeve for that purpose. The reduction in diameter in the step bearing sleeve, provided to permit the lateral cushioned movement, enables it to be withdrawn freely through the keyed ring 41.

(4) As the blade itself does not come in contact with any of the balls, either those of the step bearing or of the lateral bearing, it is not exposed to defacement or injury through wear. The blade is one of the most expensive elements of the spindle, due to the cost of making and of the high grade material of which it is made, and its life determines the life of the entire spindle, for when a blade becomes worn the whole spindle is discarded and a new one substituted. By reason of the total exclusion of all wear from the blade of my spindle, there would seem to be no limit to its useful life, barring accidents. The protection of the blade from the balls of the lateral bearing is a feature of my prior application aforesaid, but the combination of this feature with a means for protecting the blade from the balls of the step bearing, is a part of the invention which I claim herein.

(5) The principles embodied in the construction and assemblage of the step bearing are applicable to the production of a step bearing having any specific dimensions and proportions to be marketed for use with spindles of various kinds, and as repair parts. The assembling of the bearing is performed in the factory of its origin, and the user need only put it in place, being thereby relieved of the necessity of assembling or adjusting it, and of the liability of an incorrect assemblage or adjustment.

(6) A ball bearing spindle is provided of which the weight of the blade and its load is borne entirely by one ball bearing, and the lateral pull and thrust are borne by another bearing, which latter is relieved of the support of any part of the vertical load.

What I claim and desire to secure by Letters Patent is:

1. A spindle comprising a blade, a lateral ball bearing and a ball bearing step supporting and positioning said blade, the blade being out of contact with the balls and being mounted with the step bearing for lateral cushioned movement.

2. A spindle comprising a base having a socket extension, a blade, a ball bearing step resting on the bottom of said socket extension and on which said blade rests, and a lateral bearing for the blade, the step and the foot of the blade being capable of lateral cushioned movement.

3. A spindle comprising a base, a blade, a ball bearing step supporting the blade, and a lateral bearing, both bearings being supported by the base submerged in oil and arranged with the balls thereof out of contact with the blade.

4. A spindle comprising a blade, a ball bearing step on which the foot of said blade is supported, a lateral bearing for the blade, a base supporting said bearings and containing a body of oil wherein the bearings are submerged, the foot of the blade and the ball bearing step being free to move laterally.

5. A spindle comprising a base, a blade, a lateral bearing for the blade, and a step bearing comprising balls and thrust blocks so connected as to form a unit, the blade resting upon one of said blocks.

6. A spindle comprising a base, a blade, a step bearing supporting said blade comprising relatively movable thrust blocks and balls interposed between them and means preventing dismemberment of said blocks, the blade resting upon one of said blocks, and a lateral bearing for the blade.

7. A spindle comprising a blade, a ball bearing step supporting said blade, a cushion on which said step rests, and a lateral ball bearing, said blade being out of contact with the balls of both bearings.

8. A spindle comprising a blade, a ball bearing step supporting said blade, a cushion on which said step rests, and a lateral ball bearing, said blade being out of contact with the balls of both bearings, said step being mounted with freedom of lateral movement.

9. A spindle comprising a blade, a ball bearing step on which said blade rests, a cushion on which said step is mounted, a lateral ball bearing for the blade, both bearings being submerged in oil and the blade being out of contact with the balls of both bearings, and the blade and step being arranged with capability for lateral cushioned movement.

10. A spindle comprising a base, a step bearing, a blade supported by said step bearing, a lateral ball bearing including a series of balls carried by said blade but out of direct contact therewith and an outer sleeve or bolster, a base on which said step rests, and removable filling pieces inserted between said step and base for adjusting the position of the lateral ball bearing with respect to said sleeve or bolster.

11. A spindle comprising a blade, a base, and a lateral bearing comprising a sleeve surrounding the blade and mounted on said base, and a series of balls carried by the blade and running in contact with the inner surface of said sleeve, the sleeve being removable and invertible to distribute the wear of said balls thereon.

12. A spindle comprising a blade, a base, and a lateral bearing comprising a sleeve surrounding the blade and mounted on said base, and a series of balls carried by the blade and running in contact with the inner surface of said sleeve, the sleeve being removable and invertible to distribute the wear of said balls thereon, a second sleeve extending from said bearing sleeve and surrounding the lower end of the blade, and a keyed ring fitting within the first sleeve frictionally and having a key engaging the second sleeve; said ring being removable from one end of the bearing sleeve and insertible in the opposite end thereof.

13. A ball bearing spindle comprising a base, an invertible bearing sleeve or bolster rising from said base and attached at one end thereto, a blade passing through said sleeve, a ball race and a series of balls carried thereby mounted on the blade within the sleeve, said balls engaging the inner surface of the sleeve, and a whirl mounted on the blade and having a part surrounding said sleeve, said sleeve being alike at both ends and detachably mounted, whereby it may be removed, inverted, and replaced to distribute the wear of the balls thereon.

14. A ball bearing spindle comprising a base, an invertible bearing sleeve or bolster rising from said base and attached at one end thereto, a blade passing through said sleeve, a ball race and a series of balls carried thereby mounted on the blade within the sleeve, said balls engaging the inner surface of the sleeve, and a whirl mounted on the blade and having a part surrounding said sleeve, said sleeve being alike at both ends and detachably mounted, whereby it may be removed, inverted and replaced to distribute the wear of the balls thereon, a step bearing for said blade and means for elevating and depressing said step bearing to shift the aforesaid balls into contact with a different zone of the sleeve.

15. A spindle comprising a base, a bearing sleeve or bolster fixed detachably at one end to said base and rising therefrom, a step sleeve passing from within said sleeve downwardly into the base, a step bearing on the latter sleeve, a keyed ring fitting frictionally within one bearing sleeve and fitting loosely around said step sleeve, said ring and the step sleeve having a complemental key and groove coupling, a ball bearing step engaged with the end of said step sleeve, a blade passing through both sleeves and resting on said step, a ball race carried by the blade within said bearing sleeve, and balls carried by said race engaging the inner surface of the bearing sleeve, the latter being removable and invertible to distribute the wear of the balls thereon.

16. A spindle comprising a base, a bearing sleeve or bolster fixed detachably at one end to said base and rising therefrom, a step sleeve passing from within said sleeve downwardly into the base, a step bearing on the latter sleeve, a keyed ring fitting frictionally within said bearing sleeve and fitting loosely around said step sleeve, said ring and the step sleeve having a complemental key and groove coupling, a ball bearing step engaged with the end of said step sleeve, a blade passing through both sleeves and resting on said step, a ball race carried by the blade within said bearing sleeve, and balls carried by said race engaging the inner surface of the bearing sleeve, the latter being removable and invertible to distribute the wear of the balls thereon and an adjustable support for said step regulatable to raise and lower the latter, thereby shifting the blade and the balls carried by the blade with respect to the bearing sleeve, whereby to distribute the effects of wear from the balls thereon.

17. In a spindle the combination with a blade of a ball bearing step comprising thrust blocks, one of which is provided with a socket receiving the blade and from which the blade is removable by simple endwise movement, a pivot or swivel connecting said blocks in an axially alined relation and permitting one to turn relatively to the other and a circular series of balls interposed between said blocks and surrounding said pivot or swivel.

18. In a spindle the combination with a blade and a base having a socket of thrust blocks swiveled together in coaxial alinement, a pivot so connecting said blocks, said blocks having ball races in their contiguous ends concentric with said pivot, and a series of balls occupying said races, and thrust blocks being contained in the socket and supporting the blade.

19. In a spindle the combination with a blade of a step bearing comprising thrust blocks swiveled together in coaxial alinement, a pivot so connecting said blocks, said blocks having ball races in their contiguous ends concentric with said pivot, and a series of balls occupying said races, said pivot being constructed to permit axial movement between the blocks to an extent less than the depth of either ball race.

In testimony whereof I have affixed my signature.

FRED HILDRETH CHAPMAN.